Patented June 19, 1923.

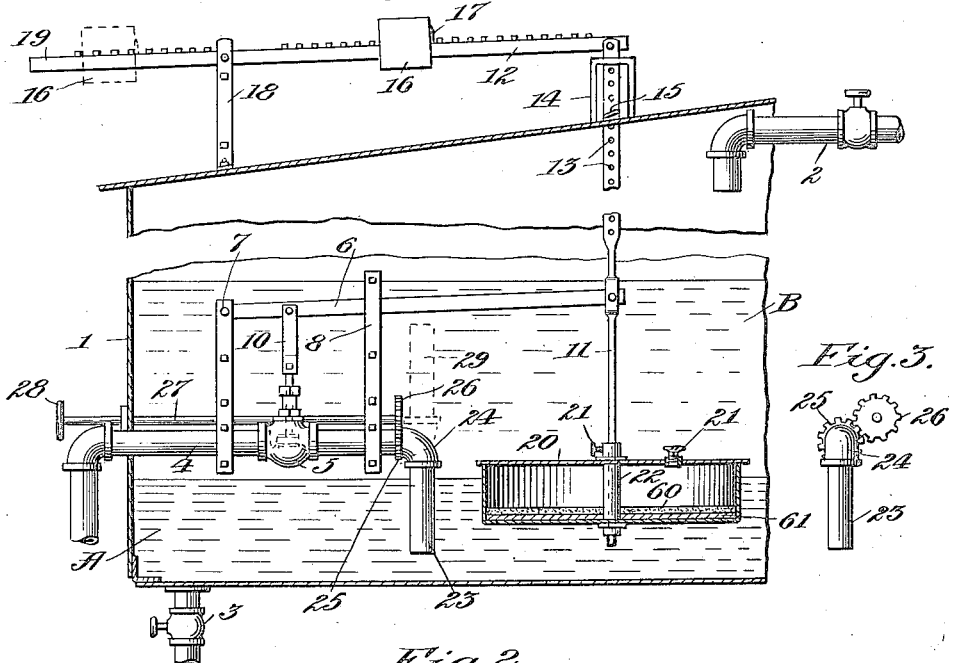

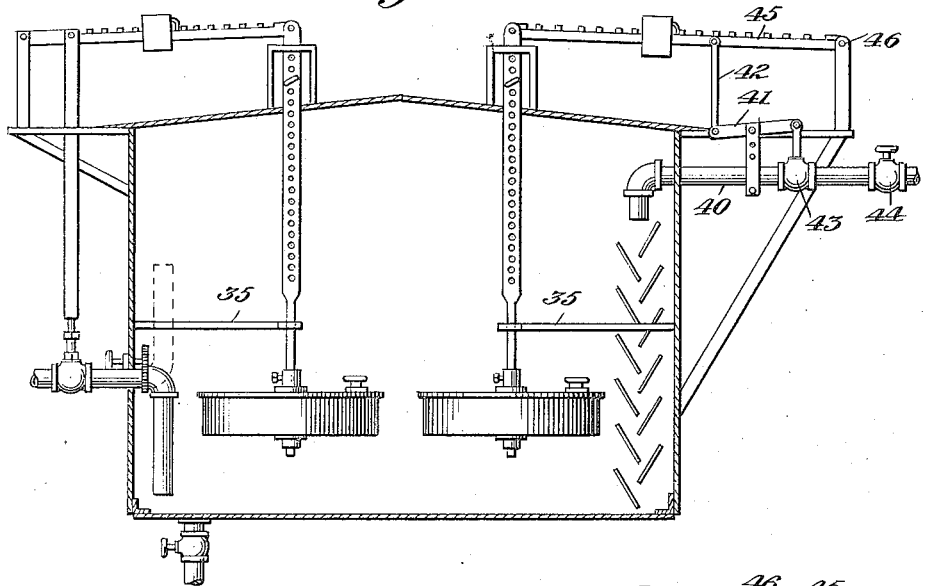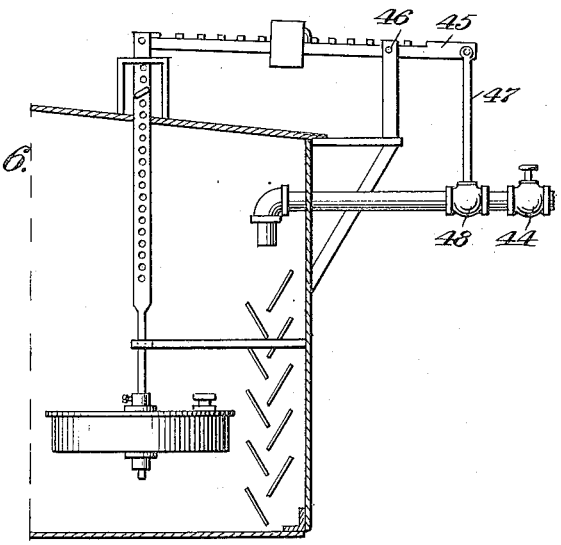

1,459,486

UNITED STATES PATENT OFFICE.

GARY M. WHITNEY AND JOHN F. FLETCHER, OF GREYBULL, WYOMING.

AUTOMATIC FLOAT VALVE FOR THE SEPARATION OF TWO IMMISCIBLE LIQUIDS.

Application filed May 9, 1922. Serial No. 559,647.

*To all whom it may concern:*

Be it known that we, GARY M. WHITNEY and JOHN F. FLETCHER, citizens of the United States, and residing at Greybull, in the county of Big Horn and State of Wyoming, have invented certain new and useful Improvements in Automatic Float Valves for the Separation of Two Immiscible Liquids, of which the following is a specification.

This invention relates to automatic float controlled valves, of the type in which the float may be adjusted at will to adapt it to operate between layers of immiscible liquids of different specific gravities, and discharge either the upper or lower liquid, and maintain a predetermined level of lower liquid.

An object of the invention is to provide a float that may be adjusted to operate with liquids of different specific gravities.

Another object is to provide a float that may be used to discharge either an upper or a lower liquid.

Another object is to provide a float that will automatically discharge any excess of a desired liquid, maintaining a predetermined quantity in a receiver. Other objects will appear upon reading the specification and drawings.

In the accompanying drawings,

Figure 1 shows one modification of the invention in which the valve and operating mechanism is within the receiving tank, and in which the counterpoise weight may be placed on either side of the fulcrum of the balance arm;

Fig. 2 is a second modification in which the valve and operating mechanism is shown outside of the tank, and in which the incoming liquids flow over baffles;

Fig. 3 is a detail showing how the drain pipe is rotated;

Fig. 4 is a detail showing a limit guide to limit the movement of the float rod; and Figs. 5 and 6 are modifications showing a float valve used to control the supply pipe.

A tank or receiver 1, is provided with a valved inlet 2, and a valved outlet 3. Entering the tank is a discharge pipe 4 controlled by an automatic valve 5 of the quick opening type. Suitably supported either from the discharge pipe 4, or the wall of the tank, is a beam 6, pivoted at 7, and arranged to move between suitable guides 8. The beam 6 is connected to the valve 5 by a connecting rod 10. At its far end the beam 6 is pivoted to a bar 11 the upper end of which is suitably suspended from a notched and graduated balance arm 12. The bar 11 may be perforated or notched at 13, and pass through a limit guide 14, the perforations 13 are arranged to receive one or more pins or bolts 15 that serve to limit the upward and downward movement of the bar 11, and also if desired, to lock the valve open or closed.

Upon the balance arm 12 is a sliding counterpoise 16 provided with a pawl 17 to secure it in any desired position. The balance arm 12 is suitably pivoted to a support 18 and extends beyond the support as at 19; the counterpoise 16 may be placed on the balance arm 12 on either side of the support 18 depending upon a plurality of conditions, such as specific gravity of the liquids, displacement of the float, weight of counterpoise, etc. Instead of the pawl 17, the counterpoise may be fastened by a set screw.

To the bar 11, below the beam 6, is adjustably secured a float box 20, by a set screw 21. The size of the float box will vary with different liquids, but it is preferably constructed so that when empty, it will float on the lighter of the liquids. The box is preferably made of non-corrodible metal, and is provided with a suitable removable closure 21 in the top, to afford access to the interior for the insertion of lead shot, mercury or other weights, 60; the box is also provided with a passage or duct 22 through which the bar 11 passes. To increase the dead weight of the box, a layer of sheet lead, 61, may be added, if found necessary. To the suction end of valve 5 is a drain pipe 23, rotatably mounted in the swivel joint 24, the latter having gear teeth 25 arranged thereon. Cooperating with the gear teeth is a gear wheel 26, suitably mounted on a shaft 27, and provided with a handle 28. The rotation or adjustment of the handle 28 will operate the wheel 26 and rotate the drain pipe 23 from its depending position to any desired position up to vertical, as shown in dotted lines at 29, thereby enabling the removal of either lower or upper liquid to a desired level.

All metal parts are made of non-corrosive metal, or suitably protected from corrosion by enamel, etc.

In the modification shown in Fig. 2, the valve proper and its operating mechanism is shown outside of the receiving tank, the connecting rod 10' being linked direct to the balance arm 12'. The principle of operation is otherwise the same. In Fig. 2 the mixed liquids from the supply pipe 2 may if desired flow over baffles 65, the object of which is to prevent splashing, and to aid in the quiet separation of the mixed liquids. The baffle may also be used in the modification shown in Fig. 1.

The dimensions of the apparatus would naturally vary with circumstances, but in a particular case, an apparatus was constructed of the following dimensions:

With a petroleum distillate of specific gravity 0.843, compared with water at 60° F. as standard, a sheet metal float box was constructed having the dimensions 6 inches by 16 inches by 24 inches. The lever connected to the valve stem has a length of 36 inches. The weight of the rod, the balance arm, and the counterpoise determine the amount of lead shot or mercury to be added to the float box. This float successfully operated in the separation of gasolene and water, the specific gravity of the gasolene varying between 0.670 to 0.875, with the necessary adjustment of the counterpoise.

The apparatus is useful in a variety of industries in which liquids immiscible in each other are collected and require separating; for example, distilling oil or other liquids with steam in which the condensed oil and water enter the tank through pipe 2; also in neutralizing and washing operations, in which the two immiscible liquids are thoroughly agitated in one apparatus, and then transferred to the settling tank; or the agitation may be effected in the settling tank; and also in the nitrating of glycerine, the spent acid would collect as the lower layer. Also in washing and separating ethyl bromide.

In operation, assuming gasolene is being distilled with steam, the condensate will enter through pipe 2, and collect as two layers, A and B. The float box 20 is adjusted with lead shot, mercury, or other weights, until it will just float on the gasolene. The counterpoise 16 is then moved forward or backward on the balance arm 12 until the float box will completely submerge in the lighter liquid, and drop to the surface of the heavier. This point on the balance arm is recorded. The float box is then placed on the bar 11 at a proper height to maintain the lower liquid at a desired level, and set screw 21 is fastened. The counterpoise 16 may then be moved one notch towards the bar 11 to insure rapid action, and the apparatus is ready to operate.

As the mixed liquids accumulate in the tank, the level of the lower one will rise and upon reaching the predetermined level, will raise the float box 20, thereby opening the valve 5 and discharge the excess. The lower liquid will by this means be kept at the predetermined level. When the upper layer of liquid becomes too deep, the handle 28 may be operated, turning the gear wheel 26 and also turning the drain pipe 23 to any desired angle. Pipe connections, not shown, are changed outside of the apparatus, to deliver the discharged upper liquid from pipe 4 to a different receiver. When a sufficient amount of upper liquid has been withdrawn, the handle 28 is again operated to restore drain 23 to its dependent position, or to any desired position.

The limit guide 14 and pin 15 may be used as a precaution in the event of violent changes in the rate of supply of liquids through pipe 2, and also to lock the valve as above noted. When adjusted as above indicated, the apparatus will operate successfully on liquids varying considerably in specific gravity without readjustment. The guide 35 in Figs. 2 and 5 serves to prevent lateral or swinging movement of the float box 20.

In the modification shown in Fig. 5, an additional float is used to control the supply pipe 40. In this figure, the balance arm 45 is fulcrumed at 46 with a connecting rod 42 suspended as shown and connected to a rocker arm 41, which latter controls valve 43. An emergency valve 44 is provided to control the supply pipe. As the level of the lower liquid in the tank rises, the float rises and closes valve 43, the upturned drain pipe 29 having been set to remove the upper liquid to a desired level.

In Fig. 6, the connecting rod 47 is shown suspended from the end of the balance arm 45, and, as in Fig. 5, operates to close the valve 48 with a rising level of the lower liquid in the tank.

What we claim is:

1. An automatic float controlled valve comprising the combination of a vale, a lever to operate said valve, a guide for said lever, a float, a supporting rod therefor, said rod pivoted to said valve lever, a balance arm, said rod pivoted to said balance arm, and an adjustable counterpoise on said balance arm.

2. An automatic float controlled valve, comprising the combination of a valve, an adjustable drain inlet for said valve, a lever to operate said valve, a guide for said lever, a float, a supporting rod therefor, said rod pivoted to said valve lever, a balance arm, said rod pivoted to said balance arm, and an adjustable counterpoise on said balance arm.

3. An automatic float controlled valve, comprising the combination of a valve, an adjustable drain inlet for said valve, means to adjust said drain inlet, a lever to operate said valve, a guide for said lever, a float, a supporting rod therefor, said rod pivoted to said valve lever, a balance arm, said rod pivoted to said balance arm, and an adjustable counterpoise on said balance arm.

4. An automatic float controlled valve, comprising the combiantion of a valve, an adjustable drain inlet for said valve, means to adjust said drain inlet, a lever to operate said valve, a guide for said lever, a float, a supporting rod therefor, said rod pivoted to said valve lever, means to limit the movement of said rod, a balance arm, said rod pivoted to said balance arm, and an adjustable counterpoise on said balance arm.

5. An automatic float controlled valve, comprising the combination of a valve, an adjustable drain inlet for said valve, means to adjust said drain inlet, a lever to operate said valve, a guide for said lever, a float, a supporting rod therefor, said float constructed to be adjustably positioned on said rod, said rod pivoted to said valve lever, means to limit the movement of said rod, a balance arm, said rod pivoted to said balance arm, and an adjustable counterpoise on said balance arm.

6. The combination comprising a tank, a supply inlet, a discharge outlet, an automatic float controlled valve, an adjustable drain inlet for said valve, means to adjust said drain inlet, a lever to operate said valve, a guide for said lever, a float, a supporting rod therefor, said float constructed to be adjustably positioned on said rod, said rod pivoted to said valve lever, means to limit the movement of said rod, a balance arm, said rod pivoted to said balance arm, and an adjustable counterpoise on said balance arm.

7. The combination comprising a tank, a supply inlet, a discharge outlet, a baffle to distribute liquid from said supply inlet, an automatic float controlled valve, an adjustable drain inlet for said valve, means to adjust said drain inlet, a lever to operate said valve, a guide for said lever, a float, a supporting rod therefor, said float constructed to be adjustably positioned on said rod, said rod pivoted to said valve lever, means to limit the movement of said rod, a balance arm, said rod pivoted to said balance arm, and an adjustable counterpoise on said balance arm.

In testimony whereof we affix our signatures.

GARY M. WHITNEY.
JOHN F. FLETCHER.